United States Patent
Barsness et al.

(10) Patent No.: US 9,391,908 B1
(45) Date of Patent: Jul. 12, 2016

(54) UNFUSING OPERATORS FROM A STREAMING PROCESSING ELEMENT TO AVOID CONGESTION

(71) Applicant: International Business Machines Corporation, Armonk, NY (US)

(72) Inventors: Eric L. Barsness, Pine Island, MN (US); Michael J. Branson, Rochester, MN (US); Alexander Cook, Rochester, MN (US); John M. Santosuosso, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/967,299

(22) Filed: Dec. 12, 2015

(51) Int. Cl.
  G06F 15/16 (2006.01)
  G06F 15/173 (2006.01)
  H04L 12/859 (2013.01)
  H04L 12/26 (2006.01)
  H04L 12/803 (2013.01)
  H04L 12/801 (2013.01)
  H04L 29/08 (2006.01)

(52) U.S. Cl.
  CPC ........ *H04L 47/2475* (2013.01); *H04L 43/0882* (2013.01); *H04L 47/122* (2013.01); *H04L 47/127* (2013.01); *H04L 67/101* (2013.01)

(58) Field of Classification Search
  CPC ..... H04L 65/80; H04L 65/60; H04L 43/0876; H04L 41/0806; H04L 67/10
  See application file for complete search history.

(56) References Cited

U.S. PATENT DOCUMENTS 7,093,023 B2    8/2006  Lockwood et al.
7,761,398 B2 *  7/2010  Jamjoom ............... G06Q 10/06
                                               706/46

(Continued)

FOREIGN PATENT DOCUMENTS

WO    2013113575 A1    8/2013

OTHER PUBLICATIONS

Takahashi et al., "Congestion Detection in Mobile Network towords Complex Event Processing", 2013 IEEE 37th Annual Computer Software and Applications Conference, p. 459-462, 2013.

(Continued)

*Primary Examiner* — Peling Shaw
(74) *Attorney, Agent, or Firm* — Martin & Associates, LLC; Derek P. Martin

(57) ABSTRACT

A streams manager determines when congestion is happening or is predicted to happen in a streaming application, and in response, unfuses one or more operators in the streaming application from its processing element. The selection of which operators to unfuse in which processing elements is made using suitable unfuse criteria, which may include selecting operators that do not maintain state, selecting operators that have a threaded port or queue preceding the operator, selecting operators at natural boundaries, and inserting queues before operators to be unfused. Once one or more operators are unfused, the streams manager can take action to enhance performance of the unfused operator(s). For example, the streams manager can allocate additional resources to the unfused operators, can create clones of unfused operators that process tuples in parallel, can move one or more unfused operators to a public cloud, etc.

9 Claims, 8 Drawing Sheets

(56) References Cited

U.S. PATENT DOCUMENTS

| | | | | |
|---|---|---|---|---|
| 8,560,527 B2* | 10/2013 | Santosuosso | ....... | H04L 67/1097 707/720 |
| 8,782,628 B2 | 7/2014 | Andrade et al. | | |
| 2009/0055838 A1* | 2/2009 | Sedukhin | ............ | G06F 11/3612 719/318 |
| 2012/0297249 A1* | 11/2012 | Yang | ..................... | G06F 9/5072 714/19 |
| 2013/0166942 A1* | 6/2013 | Branson | .............. | G06F 11/3433 714/3 |
| 2013/0179585 A1* | 7/2013 | Branson | .................... | G06F 9/54 709/231 |
| 2013/0197790 A1 | 8/2013 | Ouali et al. | | |
| 2013/0290969 A1* | 10/2013 | Branson | .................... | G06F 9/48 718/102 |
| 2013/0297802 A1* | 11/2013 | Laribi | ..................... | H04L 47/80 709/226 |
| 2013/0305034 A1* | 11/2013 | Branson | ................... | H04L 9/00 713/150 |
| 2014/0026133 A1* | 1/2014 | Parker | ................... | G06F 9/5083 718/1 |
| 2014/0101668 A1* | 4/2014 | Gedik | ................... | G06F 9/5083 718/105 |
| 2014/0278337 A1 | 9/2014 | Branson et al. | | |

OTHER PUBLICATIONS

Kumar et al., "Distributed Stream Management using Utility-Driven Self-Adaptive Middleware", Proceedings of the Second International Conference on Autonomic Computing (ICAC;05), 2005.

Madsen et al., "Integrating Fault-Tolerance and Elasticity in a Distributed Data Stream Processing System", Proceedings of the 26th International Conference on Scientific and Statistical Database Management, 2014.

Pietzuch et al., "Network-Aware Operator Placement for Stream-Processing Systems", Proceedings of the 22nd International Conference on Data Engineering, 2006.

* cited by examiner

UNFUSING OPERATORS FROM A STREAMING PROCESSING ELEMENT TO AVOID CONGESTION

BACKGROUND

1. Technical Field

This disclosure generally relates to streaming applications, and more specifically relates to unfusing operators from a streaming processing element to avoid congestion.

2. Background Art

Streaming applications are known in the art, and typically include multiple processing elements coupled together in a flow graph that process streaming data in near real-time. A processing element typically takes in streaming data in the form of data tuples, operates on the data tuples in some fashion, and outputs the processed data tuples to the next processing element. Streaming applications are becoming more common due to the high performance that can be achieved from near real-time processing of streaming data.

Many streaming applications require significant computer resources, such as processors and memory, to provide the desired near real-time processing of data. However, the workload of a streaming application can vary greatly over time. Allocating on a permanent basis computer resources to a streaming application that would assure the streaming application would always function as desired (i.e., during peak demand) would mean many of those resources would sit idle when the streaming application is processing a workload significantly less than its maximum. Furthermore, what constitutes peak demand at one point in time can be exceeded as the usage of the streaming application increases. For a dedicated system that runs a streaming application, an increase in demand may require a corresponding increase in hardware resources to meet that demand.

BRIEF SUMMARY

A streams manager determines when congestion is happening or is predicted to happen in a streaming application, and in response, unfuses one or more operators in the streaming application from its processing element. The selection of which operators to unfuse in which processing elements is made using suitable unfuse criteria, which may include selecting operators that do not maintain state, selecting operators that have a threaded port or queue preceding the operator, selecting operators at natural boundaries, and inserting queues before operators to be unfused. Once one or more operators are unfused, the streams manager can take action to enhance performance of the unfused operator(s). For example, the streams manager can allocate additional resources to the unfused operators, can create clones of unfused operators that process tuples in parallel, can move one or more unfused operators to a public cloud, etc.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

DETAILED DESCRIPTION

Figure 1:
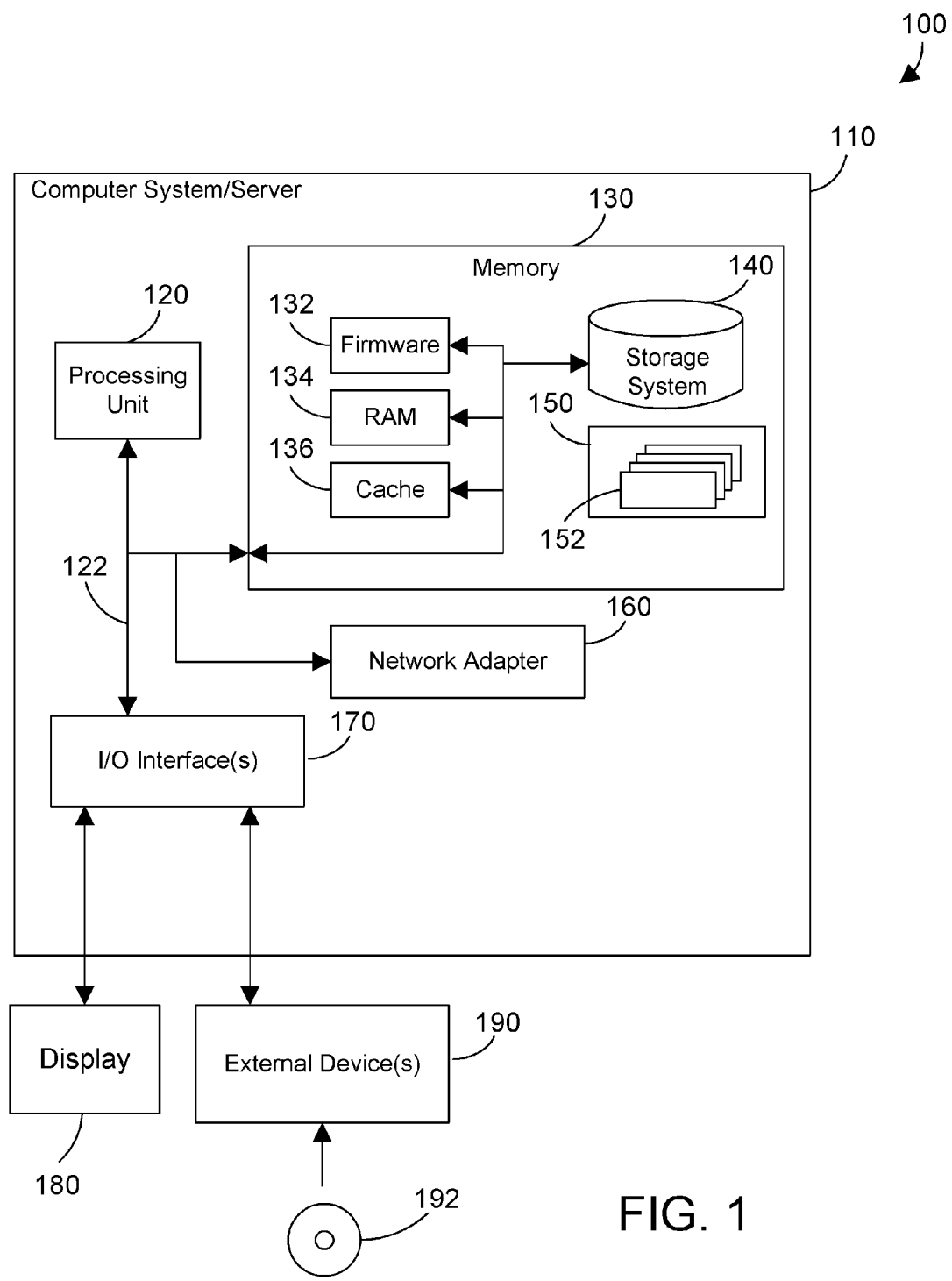
FIG. 1 is a block diagram of a cloud computing node.

The disclosure and claims herein relate to a streams manager that determines when congestion is happening or is predicted to happen in a streaming application, and in response, unfuses one or more operators in the streaming application from its processing element. The selection of which operators to unfuse in which processing elements is made using suitable unfuse criteria, which may include selecting operators that do not maintain state, selecting operators that have a threaded port or queue preceding the operator, selecting operators at natural boundaries, and inserting queues before operators to be unfused. Once one or more operators are unfused, the streams manager can take action to enhance performance of the unfused operator(s). For example, the streams manager can allocate additional resources to the unfused operators, can create clones of unfused operators that process tuples in parallel, can move one or more unfused operators to a public cloud, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processor 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media.

System memory 130 can include computer system readable media in the form of volatile, such as random access memory (RAM) 134, and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, RAID systems, tape drives, data archival storage systems, etc.

Figure 2:
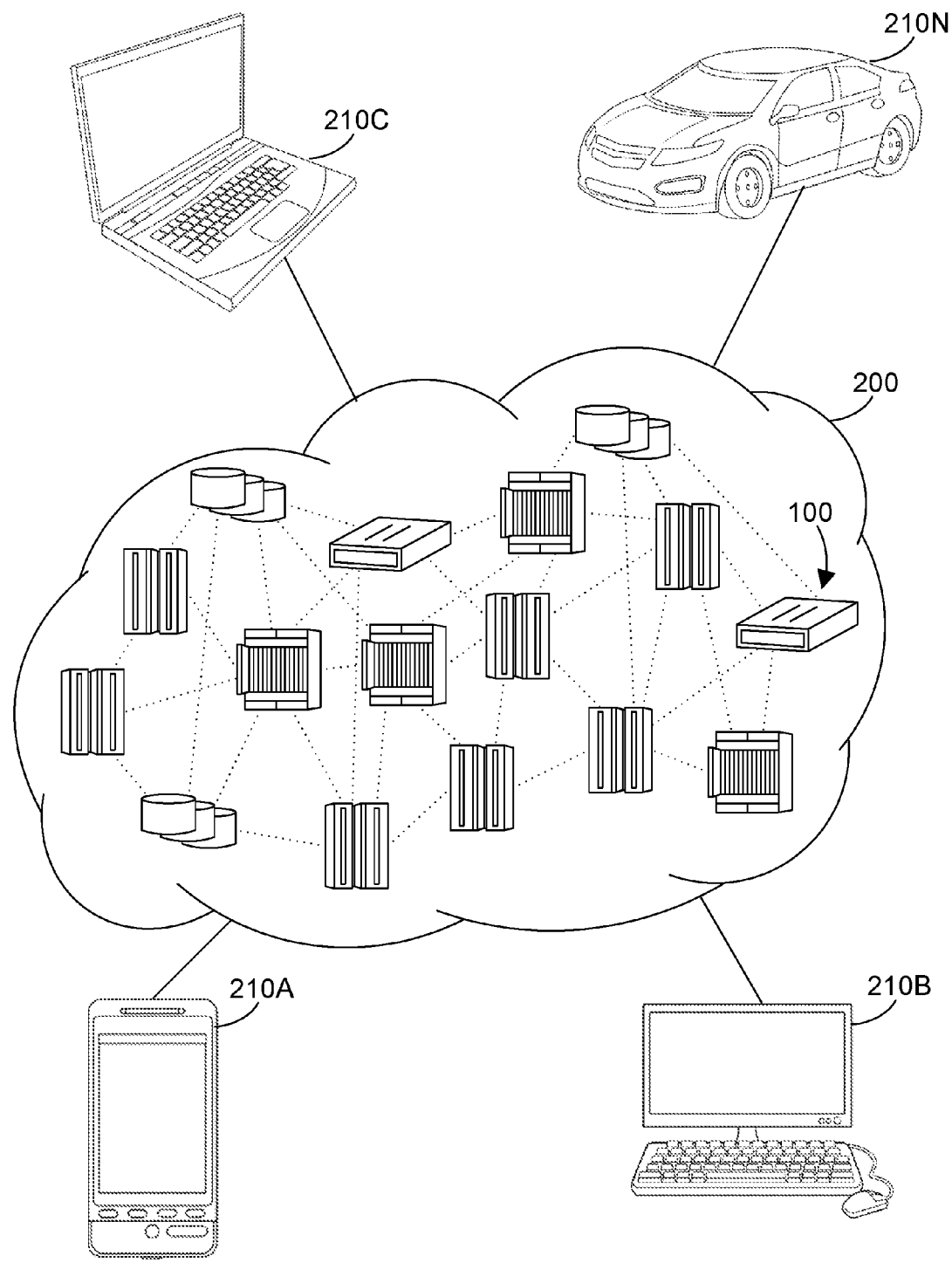
FIG. 2 is a block diagram of a cloud computing environment.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
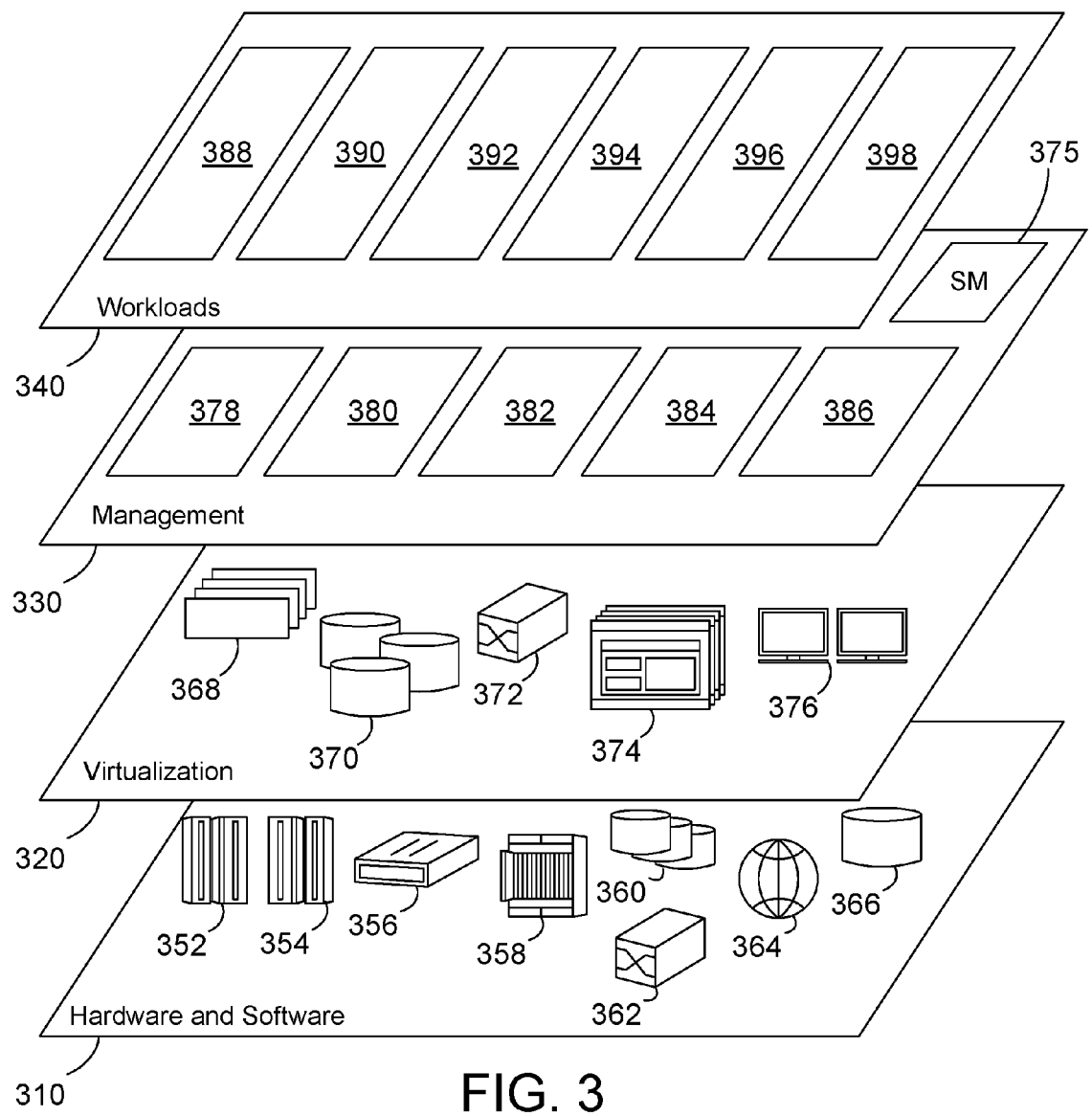
FIG. 3 is a block diagram of abstraction model layers.

Referring now to FIG. 3, a set of functional abstraction layers provided by cloud computing environment 200 (FIG. 2) is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes 352; RISC (Reduced Instruction Set Computer) architecture based servers 354; servers 356; blade servers 358; storage devices 360; and networks and networking components 362. In some embodiments, software components include network application server software 364 and database software 366.

Virtualization layer 320 provides an abstraction layer from which the following examples of virtual entities may be provided: virtual servers 368; virtual storage 370; virtual networks 372, including virtual private networks; virtual applications and operating systems 374; and virtual clients 376.

In one example, management layer 330 may provide the functions described below. Resource provisioning 378 provides dynamic procurement of computing resources and other resources that are utilized to perform tasks within the cloud computing environment. Metering and Pricing 380 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 382 provides access to the cloud computing environment for consumers and system administrators. Service level management 384 provides cloud computing resource allocation and management such that required service levels are met. Service Level Agreement (SLA) planning and fulfillment 386 provide pre-arrangement for, and procurement of, cloud computing resources for which a future requirement is anticipated in accordance with an SLA. The management layer further includes a streams manager (SM) 375 as described herein. While the streams manager 375 is shown in FIG. 3 to reside in the management layer 330, the streams manager 375 actually may span other levels shown in FIG. 3 as needed.

Workloads layer 340 provides examples of functionality for which the cloud computing environment may be utilized. Examples of workloads and functions which may be provided from this layer include: mapping and navigation 386; software development and lifecycle management 390; virtual classroom education delivery 392; data analytics processing 394; transaction processing 396 and mobile desktop 398.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
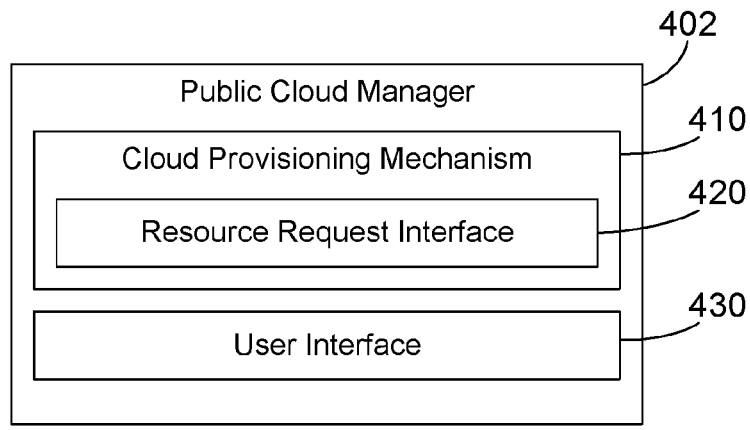
FIG. 4 is a block diagram showing some features of a public cloud manager.

FIG. 4 shows one suitable example of a public cloud manager 402. The public cloud manager 402 could reside in the management layer 330 shown in FIG. 3, or could span multiple levels shown in FIG. 3. The public cloud manager 402 includes a cloud provisioning mechanism 410 that includes a resource request interface 420. The resource request interface 420 allows a software entity, such as the streams manager 375, to request virtual machines from the public cloud manager 402 without human intervention. The public cloud manager 402 also includes a user interface 430 that allows a user to interact with the public cloud manager to perform any suitable function, including provisioning of VMs, destruction of VMs, performance analysis of the cloud, etc. The difference between the resource request interface 420 and the user interface 430 is a user must manually use the user interface 430 to perform functions specified by the user, while the resource request interface 420 may be used by a software entity to request provisioning of cloud resources by the public cloud manager 402 without input from a human user. Of course, public cloud manager 402 could include many other features and functions known in the art that are not shown in FIG. 4.

Figure 5:
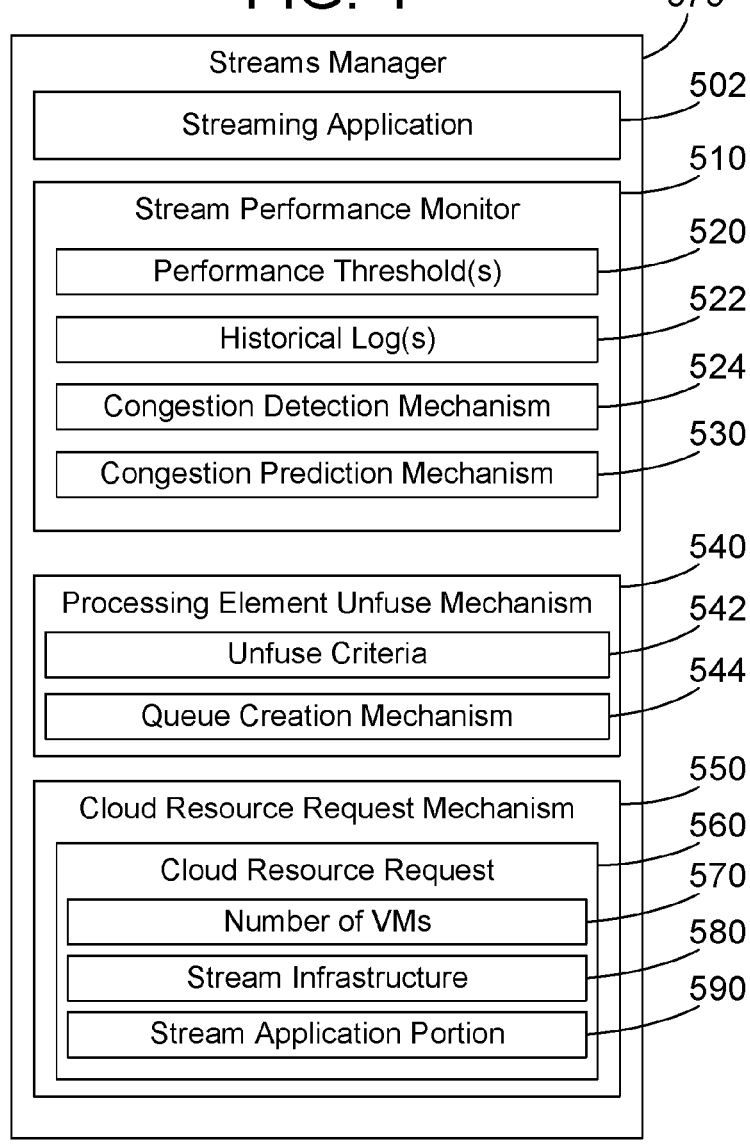
FIG. 5 is block diagram showing features of a streams manager that can unfuse one or more operators in a streaming application when congestion is detected or predicted.

FIG. 5 shows one suitable example of the streams manager 375 shown in FIG. 3. The streams manager 375 is software that manages one or more streaming applications 502, including creating operators and data flow connections between operators in a flow graph that represents a streaming application 502. The streams manager 375 includes a performance monitor 510 with one or more performance thresholds 520. Performance thresholds 520 can include static thresholds, such as percentage used of current capacity, and can also include any suitable heuristic for measuring performance of a streaming application as a whole or for measuring performance of one or more operators or processing elements in a streaming application. Performance thresholds 520 may include different thresholds and metrics at the operator level, at the level of a group of operators, at the level of processing elements that include multiple operators, and/or at the level of the overall performance of the streaming application. Performance of a streaming application may also be measured by comparing current performance to past performance in one or more historical logs 522. Note the performance measured can include performance for a single operator, performance for a group of operators, performance for processing elements that include multiple operators, and performance for the streaming application as a whole. A congestion detection mechanism 524 detects when congestion is occurring in the streaming application 502. Congestion detection mechanism 524 can detect congestion based on performance threshold(s) 520, based on historical log(s) 522, or based on any other suitable criteria. A congestion prediction mechanism 530 predicts when the streaming application 502 will experience congestion. The congestion prediction mechanism 520 may predict congestion based on historical log(s) 522. For example, if the streaming application delivers news, and the historical log(s) 522 indicate heavy demand that can cause congestion for the streaming application from 8:00 AM to 9:00 AM weekday mornings, the congestion prediction mechanism 530 can predict congestion from 8:00 AM to 9:00 AM weekday mornings based on the historical log(s) 522. The congestion prediction mechanism 530 could also predict congestion based on monitoring performance of upstream operators.

The streams manager 375 also includes a processing element unfuse mechanism 540 that unfuses one or more operators from their processing elements according to at least one unfuse criterion, shown in FIG. 5 as unfuse criteria 542. The processing element unfuse mechanism 540 includes a queue creation mechanism 544 so queues can be created and inserted before operators so the operators can be unfused from a processing element, as discussed in more detail below.

After one or more operators are unfused from their processing element(s), the streams manager 375 may take action to improve performance of the streaming application 502. For example, the streams manager can increase allocation of hardware resources to one or more of the unfused operators, thereby decreasing congestion in the flow graph. The streams manager could also clone one or more operators to process tuples in parallel, thereby decreasing congestion in the flow graph. In addition, the streams manager could deploy one or more of the unfused operators to one or more VMs in a public cloud. Once the unfused operator(s) to be deployed to a virtual machine in a public cloud are selected, the streams manager 375 communicates the need for resources to the cloud resource request mechanism 550. The cloud resource request mechanism 550 assembles a cloud resource request 560, which can include information such as a number of VMs to provision 570, stream infrastructure needed in each VM 580, and a stream application portion 590 for each VM. Once the cloud resource request 560 is formulated, the streams manager 375 submits the cloud resource request 560 to a public cloud manager, such as public cloud manager 402 shown in FIG. 4.

The cloud resource request can be formatted in any suitable way. A simple example will illustrate two suitable ways for formatting a cloud resource request. Let's assume the streams manager determines it needs two VMs, where both have common stream infrastructure, with a first of the VMs hosting operator A and the second of the VMs hosting operator B. The cloud resource request 560 in FIG. 5 could specify two VMs at 570, could specify the common stream infrastructure, such as an operating system and middleware, at 580, and could specify operator A and operator B at 590. In response, the cloud manager would provision two VMs with the common stream infrastructure, with the first of the VMs hosting operator A and the second of the VMs hosting operator B. In the alternative, the cloud resource request 560 could be formulated such that each VM is specified with its corresponding stream infrastructure and stream application portion. In this configuration, the cloud resource request would specify a first VM with the common stream infrastructure and operator A, and a second VM with the common stream infrastructure and operator B. Of course, multiple operators could also be deployed to a single VM.

Figure 6:
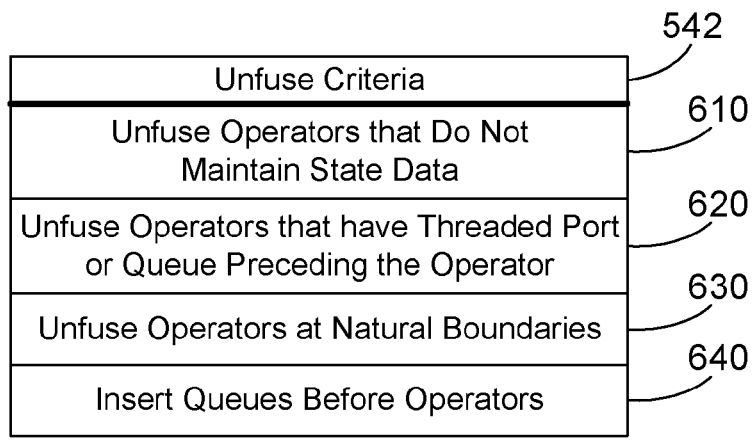
FIG. 6 is a table showing suitable unfuse criteria the streams manager may use when deciding which operators to unfuse.

FIG. 6 shows some suitable examples for unfuse criteria 542 shown in FIG. 5, which include to unfuse operators that do not maintain state data 610; unfuse operators that have a threaded port or queue preceding the operator 620; unfuse operators at natural boundaries 620; and insert queues before operators 640. When an operator dos not maintain state data, it can be unfused from a processing element since the time it would take to drop and reestablish connections with the rest of the graph would be trivial. When an operator has a threaded port or queue preceding the operator, the operator can be unfused because the threaded port or queue can buffer tuples input to the operator during the time it takes to unfuse the operator, thereby reducing any real-time issues in processing tuples. Operators at natural boundaries of the flow graph can also be unfused. For example a tumbling aggregate operator would have no state once the operator is done tumbling. An operator can be considered a natural boundary when the operator does something at a tumbling window level, meaning data is processed every X tuples or every Y minutes. A sort or join operator, or user-written operators, could be tumbling operators that are natural boundaries. Inserting queues before operators can reduce the real-time effects of unfusing an operator by buffering tuples during the time it takes to unfuse the operator. In one particular implementation, the unfuse criteria shown in FIG. 6 are an ordered list in order of priority, which means operators that satisfy 610 are considered first, followed by operators that satisfy 620, and so on through 640. While specific unfuse criteria are shown in FIG. 6 by way of example, the disclosure and claims herein expressly extend to any suitable unfuse criteria that could be used to select and unfuse one or more operators in one or more processing elements in a flow graph for a streaming application.

Figure 7:
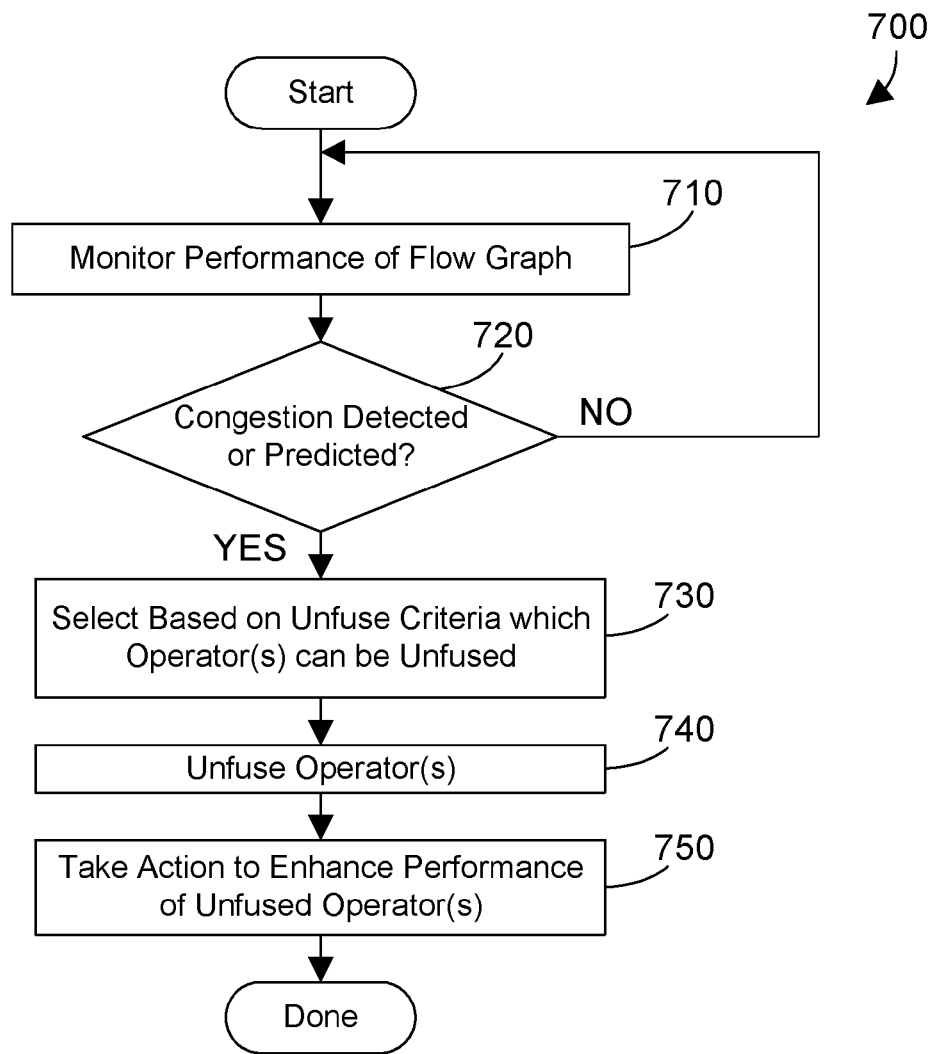
FIG. 7 is a flow diagram of a method for a streams manager to unfuse one or more operators.

Referring to FIG. 7, a method 700 shows one suitable example for enhancing performance of a streaming application, and is preferably performed by the streams manager 375. The performance of the flow graph is monitored (step 710). When congestion is not detected or predicted (step 720=NO), method 700 loops back to step 710 and continues. When congestion is detected or predicted (step 720=YES), select based on unfuse criteria which operator(s) can be unfused (step 730). Unfuse the selected operator(s) from other operators in a processing element (step 740). Take action to enhance performance of the unfused operator(s) (step 750). Action to enhance performance of the unfused operator(s) in step 750 may include, for example, increasing allocation of hardware to an unfused operator; cloning an unfused operator to process tuples in parallel; and moving an unfused operator to a public cloud. Of course, other actions to enhance performance of the unfused operator(s) are also within the scope of the disclosure and claims herein. Method 700 is then done. Method 700 allows a streams manager to make intelligent decisions regarding which operator(s) to unfuse from their processing elements and how to enhance performance of one or more unfused operators.

Figure 8:
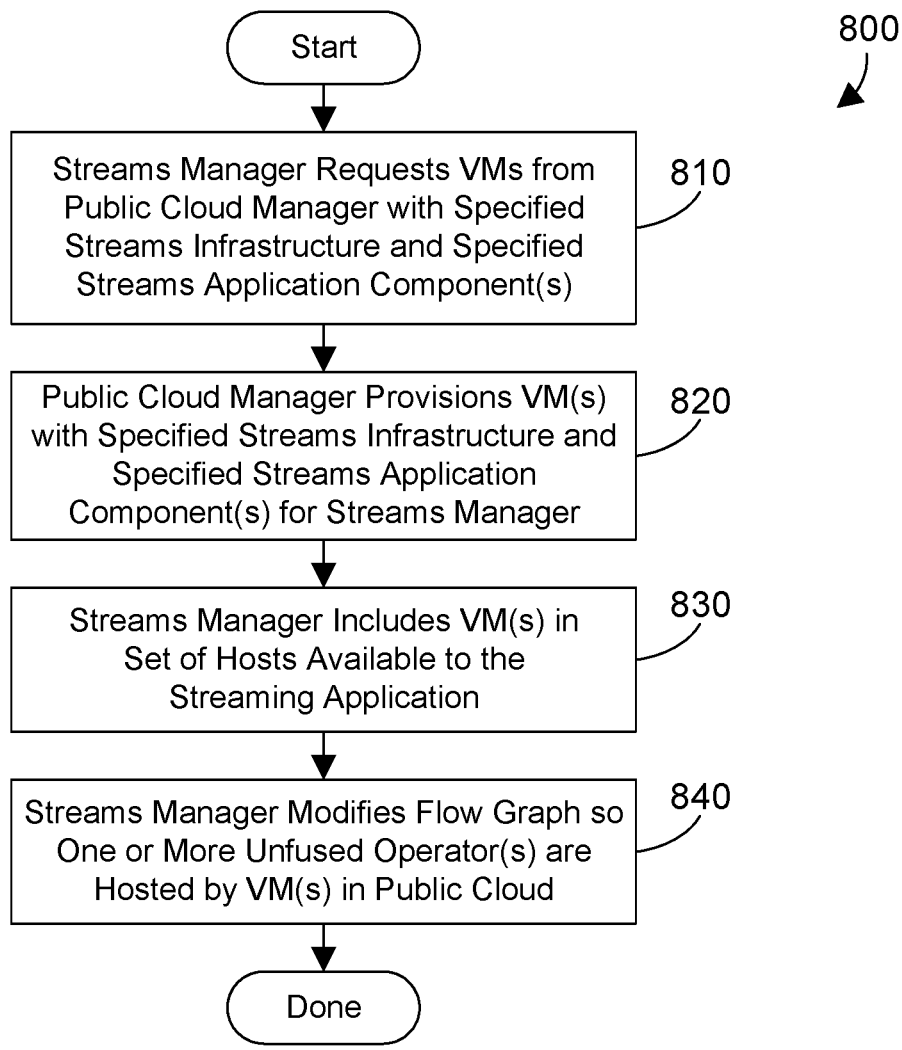
FIG. 8 is a flow diagram of a method for a streams manager to move one or more unfused operators in a streaming application to a public cloud.

Referring to FIG. 8, a method 800 shows one suitable example for enhancing performance of a streaming application, and is preferably performed by the streams manager 375 interacting with the public cloud manager 402. Method 800 represents an action the streams manager could take in step 750 in FIG. 7. The streams manager requests resources, such as VMs, from the cloud manager with specified streams infrastructure and specified streams application components (step 810). The public cloud manager provisions the VMs with the specified streams infrastructure and specified streams application component(s) for the streams manager (step 820). The streams manager includes the VM(s) in the set of hosts available to the streaming application (step 830). The streams manager then modifies the flow graph so one or more portions are hosted by one or more VMs in the public cloud (step 840). Method 800 is then done.

Figure 9:
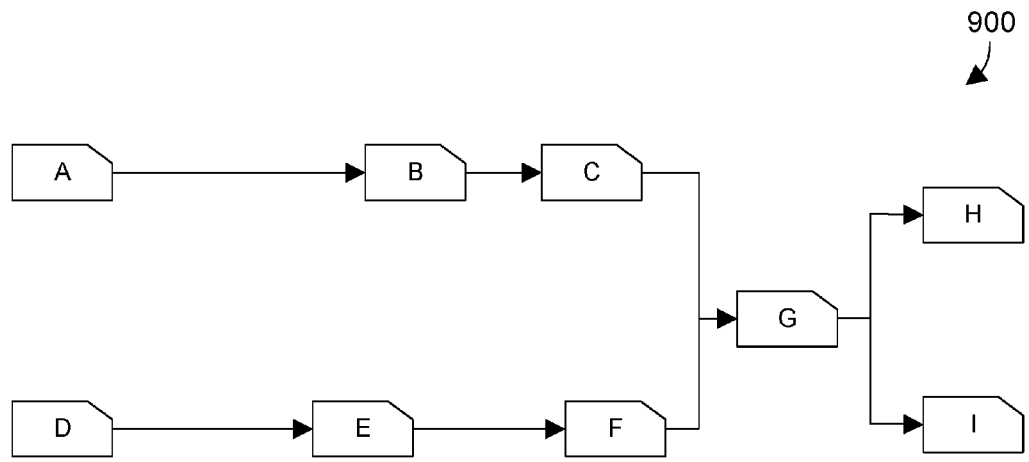
FIG. 9 is a block diagram showing a specific example of a flow graph corresponding to a streaming application.

A very simple flow graph is shown at 900 in FIG. 9 for the purpose of illustrating the concepts herein. A streaming application 900 includes processing elements A, B, C, D, E, F, G, H and I as shown. Processing element A originates a stream of tuples, which is processed by processing element B, which outputs tuples. The tuples from processing element B are processed by processing element C, which outputs tuples to processing element G. In similar fashion, processing element D originates a stream of tuples, which is processed by processing element E, which outputs tuples that are processed by processing element F, which outputs tuples to processing element G. Note that processing element G receives tuples from both processing element C and processing element F. Processing element G processes the tuples it receives from processing element C and from processing element F, and outputs its tuples to processing elements H and I. We assume for this example the streaming application 900 initially runs on a dedicated system 910, such as a computer system/server 100 shown in FIG. 1.

Figure 10:
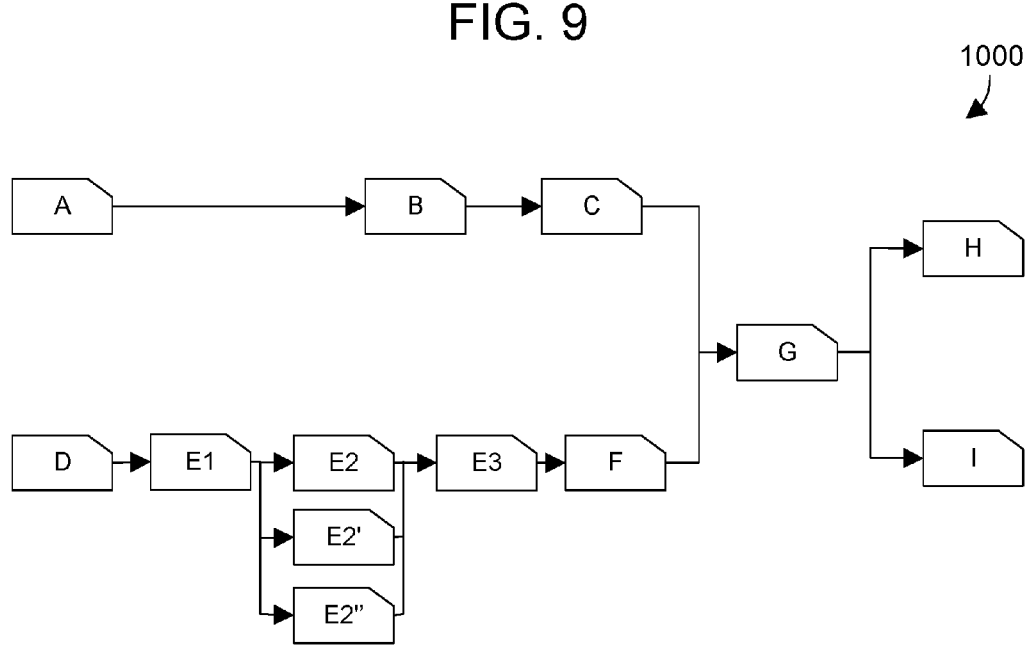
FIG. 10 is a block diagram showing a first example of how operators in the flow graph in FIG. 9 can be unfused.

For this specific example, the stream performance monitor 510 in FIG. 5 monitors performance of the streaming application 900 in FIG. 9 in accordance with one or more defined performance thresholds 520 or one or more historical log(s) 522 to determine when congestion is occurring or is predicted to occur. We assume the streaming application 900 runs and the congestion detection mechanism 524 detects congestion in processing element E, which means the tuples are not being processed by processing element E at a fast enough rate. In response to the congestion detection mechanism detecting congestion in processing element E, we assume the streams manager selects processing element E to unfuse because processing element E does not maintain state data, satisfying unfuse criterion 610 shown in FIG. 6. The streams manager then unfuses processing element E into its constituent operators E1, E2 and E3, as shown in FIG. 10. The streams manager could allocate additional hardware, such as CPU or memory resources, to any or all of processing elements E1, E2 and E3 in FIG. 10. After unfusing processing element E, we assume further operator E2 is still experiencing congestion, while operators E1 and E3 are not experiencing congestion. For this example, the streams manager could allocate additional hardware to operator E2 without allocating additional hardware to operators E1 and E3. In addition, we determine the streams manager could clone operator E2 as shown at E2' and E2" in FIG. 10 to process tuples in parallel with operator E2, thereby increasing the throughput in the streaming application 1000 at the point of congestion.

While the example discussed above unfused all of operators E1, E2 and E3, it is within the scope of the disclosure and claims herein to unfuse one operator while keeping the rest of the operators fused together. For example, let's assume operator E1 within processing element E is experiencing congestion, but processing elements E2 and E3 are not. In this case, E1 could be unfused from processing element E while keeping E2 and E3 fused together in processing element E. The disclosure and claims herein expressly extend to unfusing any or all operators within a processing element while possible leaving one or more operators fused within a processing element.

Figure 11:
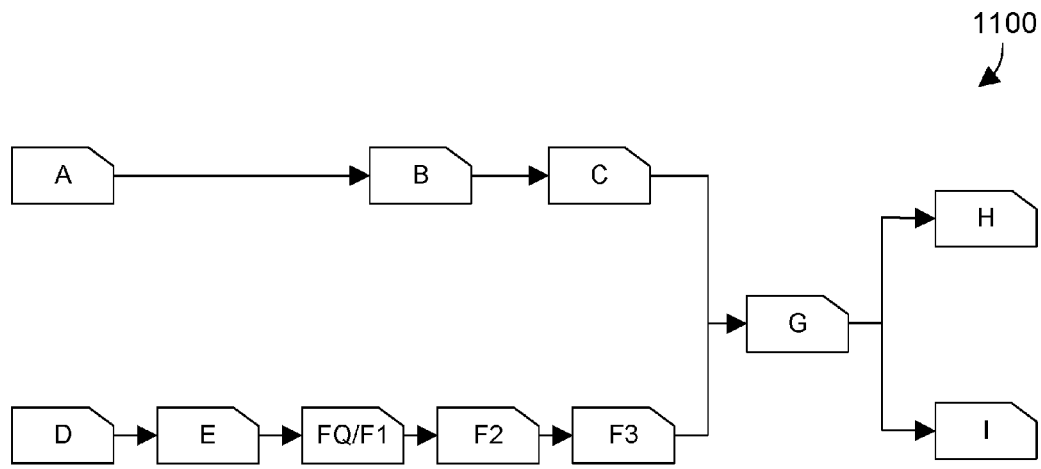
FIG. 11 is a block diagram showing a second example of how operators in the flow graph in FIG. 9 can be unfused.

In a second example, we now consider the flow graph in FIG. 9, and assume the congestion prediction mechanism 530 predicts congestion in processing element F based on historical log(s) 522 shown in FIG. 5. We further assume processing element F has constituent operators F1, F2, and F3, where F1 includes a queue FQ, as shown in FIG. 11. Because operator F1 includes a queue FQ, this means processing element F is selected based on unfuse criterion 620 in FIG. 6. Unfusing F1 will have a less likelihood of data loss due to the queue in F1 buffering tuples while F1 is being unfused. Operator F1 with its queue is then unfused from processing element F, as shown in FIG. 11. In this example, we assume processing element F still has operators F2 and F3 fused together. The result of unfusing FQ/F1 is thus a new processing element that includes FQ/F1 and the old processing element F that includes F2 and F3. Once unfused, the streams manager could enhance the performance of operator F1 by allocating additional hardware, by cloning to process tuples in parallel, or by moving F1 to a public cloud.

Figure 12:
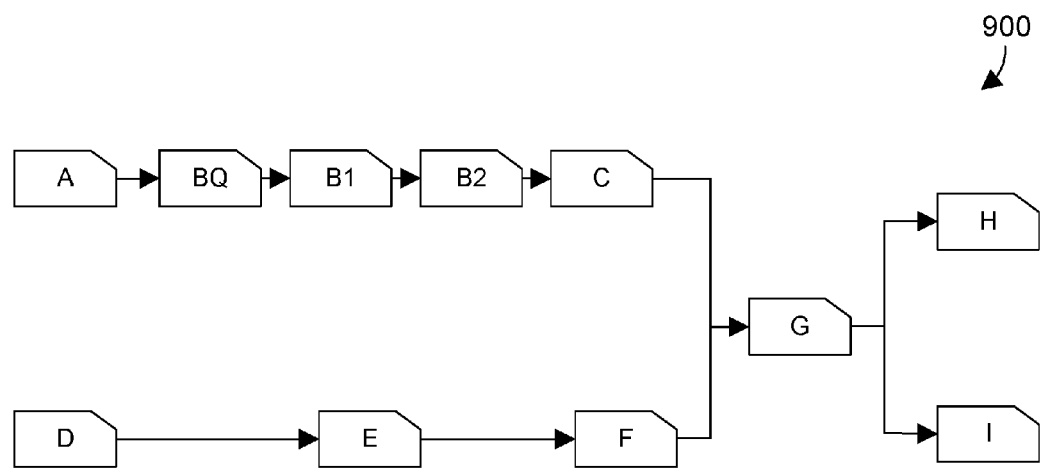
FIG. 12 is a block diagram showing a third example of how operators in the flow graph in FIG. 9 can be unfused.

In a third example, we consider the flow graph in FIG. 9, and assume the congestion detection mechanism 524 detects congestion in processing element B. We assume processing element B maintains state data, and does not have a preceding threaded port or queue, so neither of the unfuse criteria 610 or 620 in FIG. 6 are satisfied. So processing element B is selected and unfused because it can have a queue BQ inserted before the operator B1 by the queue creation mechanism 522 shown in FIG. 5, satisfying unfuse criterion 640 in FIG. 6. FIG. 12 shows operator B1 unfused from processing element B, while we assume operator B2 is still fused to processing element B. Unfused operator B has a queue BQ added that precedes it. Note the difference between FIG. 11, where processing element F was selected and unfused because it already had a preceding queue FQ, and FIG. 12, where processing element B was selected and unfused because a preceding queue BQ could be added to mitigate the real-time effects of unfusing operator B. Note the adding of a queue is not the most preferred solution, as shown by entry 640 in table 542 being last on the prioritized list.

The disclosure and claims herein relate to a streams manager that determines when congestion is happening or is predicted to happen in a streaming application, and in response, unfuses one or more operators in the streaming application from its processing element. The selection of which operators to unfuse in which processing elements is made using suitable unfuse criteria, which may include selecting operators that do not maintain state, selecting operators that have a threaded port or queue preceding the operator, selecting operators at natural boundaries, and inserting queues before operators to be unfused. Once one or more operators are unfused, the streams manager can take action to enhance performance of the unfused operator(s). For example, the streams manager can allocate additional resources to the unfused operators, can create clones of unfused operators that process tuples in parallel, can move one or more unfused operators to a public cloud, etc.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. An apparatus comprising:
   at least one processor;
   a memory coupled to the at least one processor;
   a streaming application residing in the memory and executed by the at least one processor, the streaming application comprising a flow graph that includes a plurality of processing elements that process a plurality of data tuples, wherein each of the plurality of processing elements comprises at least one operator;
   a performance monitor residing in the memory and executed by the at least one processor, the performance monitor monitoring performance of the plurality of processing elements in the flow graph, the performance monitor comprising a congestion detection mechanism that detects when congestion occurs in the plurality of processing elements; and
   a streams manager residing in the memory and executed by the at least one processor, the streams manager managing the streaming application, and when the performance monitor detects that congestion is occurring in the plurality of processing elements, in response, the streams manager selects based on at least one unfuse criterion at least one operator in the flow graph and unfuses the selected at least one operator from its corresponding processing element to improve congestion, wherein the at least one unfuse criterion specifies to unfuse operators that do not maintain state data.

2. The apparatus of claim 1 wherein the streams manager further comprises a congestion prediction mechanism that predicts when congestion will occur in the plurality of processing elements, and selects based on the at least one unfuse criterion at least one operator in the flow graph and unfuses the selected operator from its corresponding processing element when congestion is predicted to occur.

3. The apparatus of claim 1 wherein the at least one unfuse criterion specifies to unfuse operators that are preceded by a threaded port or queue.

4. The apparatus of claim 1 wherein the at least one unfuse criterion specifies to unfuse operators at natural boundaries in the flow graph.

5. The apparatus of claim 1 wherein the at least one unfuse criterion specifies to insert queues before operators and to unfuse the operators after the queues have been inserted.

6. The apparatus of claim 1 wherein the streams manager requests additional hardware resources for at least one of the unfused operators.

7. The apparatus of claim 1 wherein the streams manager clones at least one of the unfused operators to process tuples in parallel.

8. The apparatus of claim 1 wherein the streams manager moves at least one of the unfused operators to a public cloud by requesting a public cloud manager to provision at least one virtual machine with logic to implement the at least one unfused operator, and when the public cloud manager provisions the at least one virtual machine, the streams manager modifies the flow graph to include the at least one virtual machine in the flow graph of the streaming application.

9. The apparatus of claim 1 wherein the congestion detection mechanism detects when congestion is occurring in the plurality of processing elements by comparing current performance of the streaming application to at least one performance threshold or historical performance of the streaming application.

\* \* \* \* \*